(No Model.) 2 Sheets—Sheet 1.
J. F. SANTILLANA.
LEVELING AND MEASURING TELEMETER.
No. 499,939. Patented June 20, 1893.
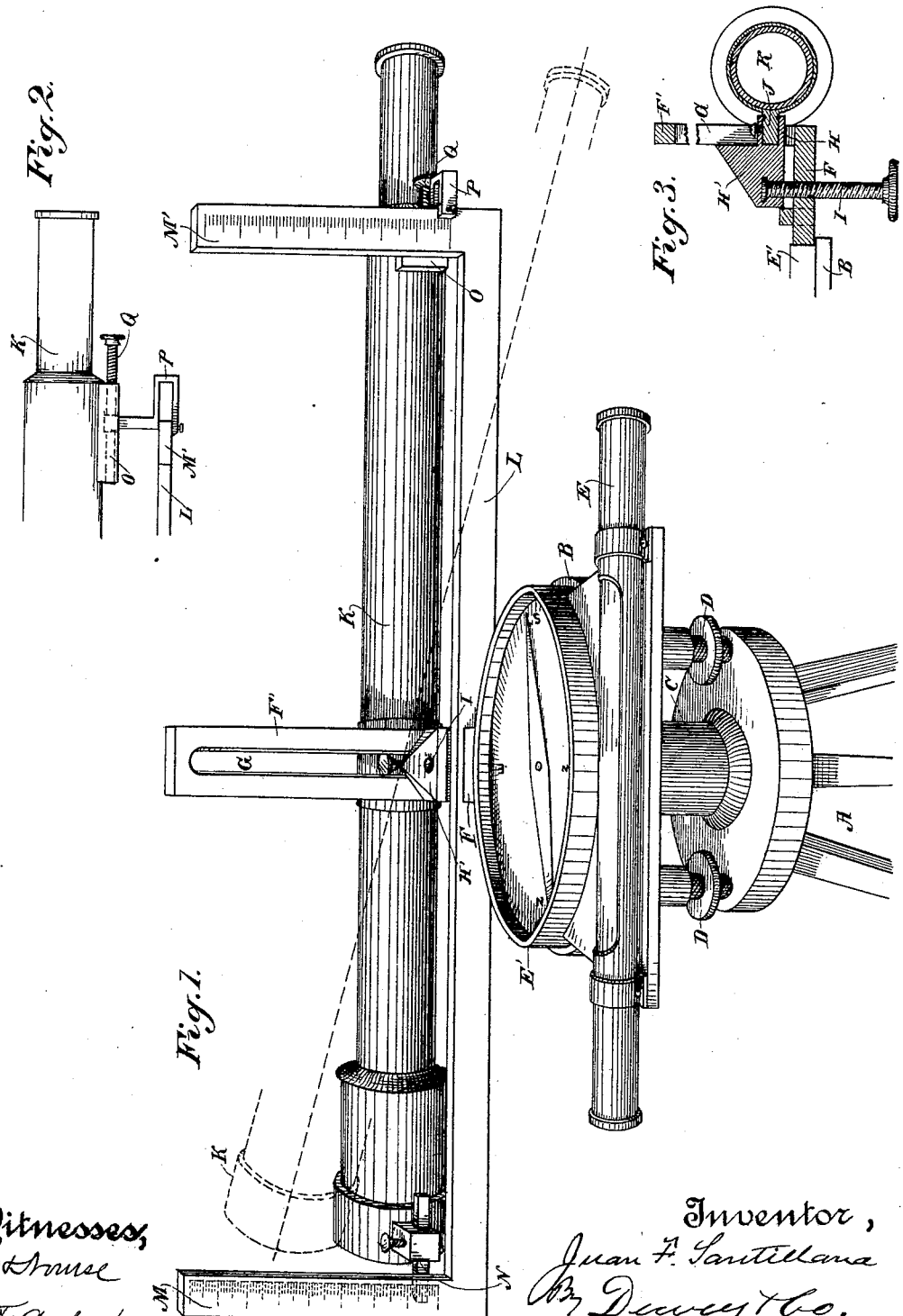
Witnesses,
Inventor,
Juan F. Santillana
By Dewey & Co.
Attys (No Model.) 2 Sheets—Sheet 2.

J. F. SANTILLANA.
LEVELING AND MEASURING TELEMETER.

No. 499,939. Patented June 20, 1893.

Witnesses,

Inventor,
Juan F. Santillana
By Dewey & Co
Attys

UNITED STATES PATENT OFFICE.

JUAN F. SANTILLANA, OF SAN FRANCISCO, CALIFORNIA, ASSIGNOR OF ONE-FOURTH TO EUSTORJIO CALDERON, OF SAME PLACE.

LEVELING AND MEASURING TELEMETER.

SPECIFICATION forming part of Letters Patent No. 499,939, dated June 20, 1893.

Application filed December 31, 1892. Serial No. 456,897. (No model.)

*To all whom it may concern:*

Be it known that I, JUAN F. SANTILLANA, a citizen of San Salvador, residing in the city and county of San Francisco, State of California, have invented an Improvement in Leveling and Measuring Telemeters; and I hereby declare the following to be a full, clear, and exact description of the same.

My invention relates to a device which I term a measuring and leveling telemeter.

It consists in certain details of construction which will be more fully explained by reference to the accompanying drawings, in which—

Figure 4:
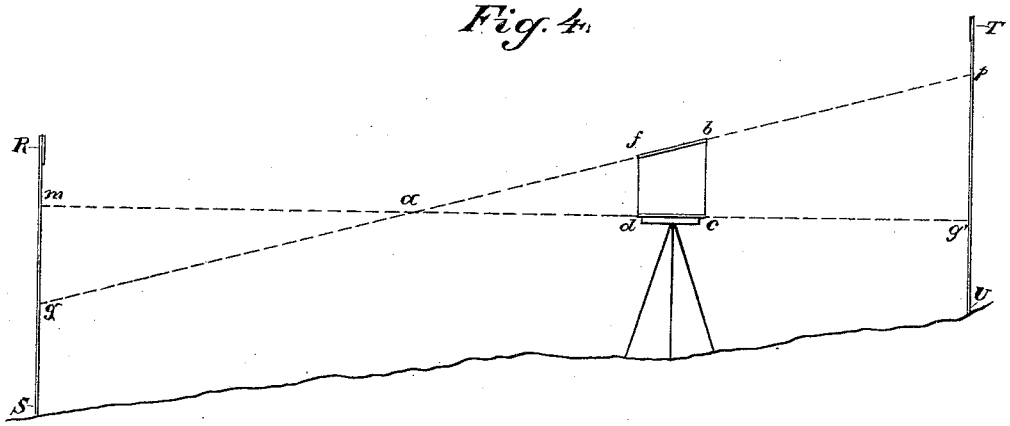
Figure 5:
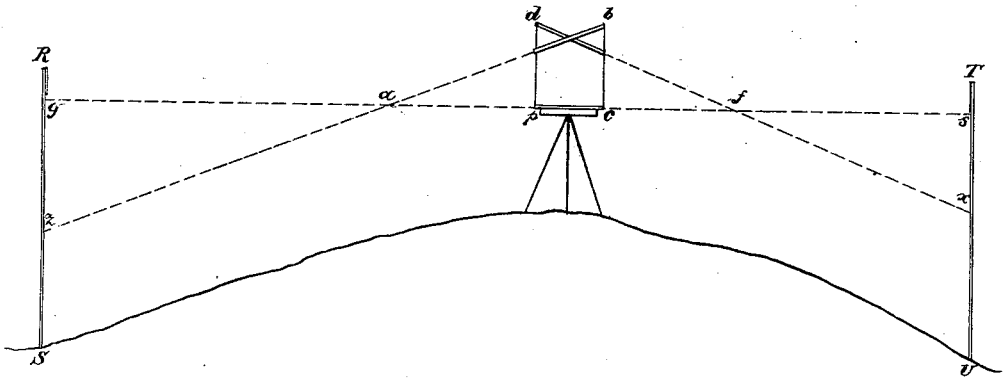
Figure 6:
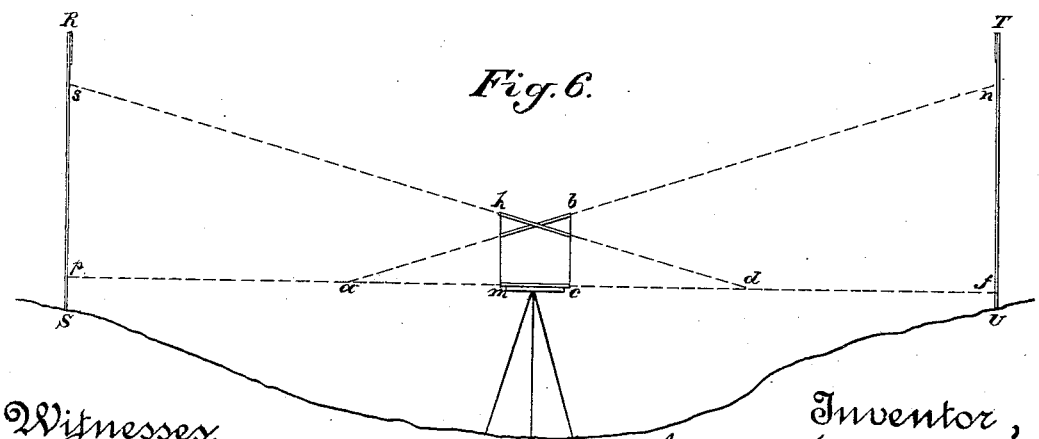

Figure 1 is a perspective view of my telemeter. Fig. 2 is a view of the front end of the telescope. Fig. 3 is a vertical cross section through the center of the telescope, showing its connection with the compass case. Figs. 4, 5 and 6 are diagrams showing the telemeter in different positions.

The object of my invention is to provide a single apparatus in which by the use of a telescope which is movable in a vertical plane and adjustable to different angles, together with graduated rods to be set at distant points, I am enabled with but little calculation to accurately determine the distances of such points, and at the same time the apparatus is used as a level.

A is a tripod of any ordinary construction.

B is a disk having a shank C and universal joint by which it is supported from the top of the tripod, and D are leveling screws by which the disk is brought to a perfectly horizontal plane.

E is a level, which may be of any usual or suitable construction, fixed to one side of the disk, so that by turning the disk into positions at right angles with each other, it may be determined when the disk is level, or if desired two levels at right angles with each other may be employed in the usual manner. Upon this disk is mounted a compass case E' having a needle and a card graduated to degrees in the usual manner, which may be used in surveying when desirable. This upper disk and compass case are rotatable upon the disk B about a vertical axis.

From one side of the case E' extends an arm F projecting horizontally as shown, and having an arm F' extending upwardly at right angles with it. This arm F' is slotted as shown at G, and in this slot is fitted a sleeve or barrel H which is connected by an arm H' with the screw I by which it may be raised or depressed. Within this sleeve is the central shaft J, to which the center of the telescope K is fixed, the shaft turning within the sleeve to allow the telescope to be turned to any desired vertical angle. By means of the adjusting screw, the telescope may be raised or depressed within the slot as may be desired.

L is a bar having a slot made through its center so that it fits upon the bar F by which it is supported. At opposite ends of this bar are the upwardly projecting vertical portions M and M' having scales marked upon them as shown. These scales may be of any description, but I have found that a metrical scale is more convenient, as the calculations can be more rapidly made with such a scale.

In the present case I have illustrated my apparatus as having the horizontal telescope support as fifty centimeters long, and the vertical arms M M' as one decimeter in length, the subdivisions being made of any required degree of fineness.

N is a piece fixed upon one side and in the horizontal plane through the line of vision in the axis of the telescope. This piece extends to a point where it is in close proximity with the graduations upon the vertical arm M, and as the telescope is moved this point indicates exactly the subdivision opposite which the axis of the telescope stands at that end.

O is a piece fixed upon the opposite end of the telescope, and P is an arm extending horizontally from it toward the vertical scale M'. By means of a screw Q the arm P may be advanced or withdrawn, and made to correspond with either of the subdivisions of the vertical portion M'. By means of a set screw the telescope may be fixed at any desired subdivision.

In using this apparatus I employ the usual leveling rods which may be subdivided as desired and have the movable targets upon them.

There are three positions in which I have shown this instrument, any one of which it may be necessary to occupy: in the first case, when the instrument is set upon an inclined surface in which there is a gradual rise from the position of one of the rods to that of the other; in the second position when the apparatus stands upon a point above the base of both the rods; and, thirdly, when the apparatus is in a position in a valley below the bases of the two rods. In each of these cases the formula will differ slightly. In the diagram illustrating these positions, I have shown in Fig. 4 the apparatus standing upon an incline. The telescope being first set in a horizontal position in the lower part of the slot G, the line of vision may be indicated by the letters g' m. The telescope is then raised in the slot, and is inclined at the same time so as to cut the horizontal line at a certain distance from the instrument. The vertical scales M M' show the angular positions of the opposite ends of the telescope.

In using the metrical system I, for convenience, suppose that the inclined line cuts the horizontal line at a point ten meters from the point of vision, and the line a c then represents ten meters, the vertical line c b represents $0^m.1$ or one hundred millimeters, and the distance c d is equal to the distance between the two vertically graduated arms M M' which in this case is $0^m.5$. With these figures known it is easy to calculate the other distances. The proportion then formed will be as follows:

$$\text{As } a\ c : b\ c :: a\ c - c\ d : d\ f.$$

Substituting the figures for the letters we have $$\text{as } 10^m : 0^m.1 :: 9^m.50 : d\ f$$

$$d\ f = \frac{9^m.5 \times 0^m.1}{10^m} = 0^m.095$$

We find then that to cut the imaginary horizontal line with the inclined line at a distance of ten meters, the elevation of the rear end of the telescope being $0^m.1$ of a meter, the other extreme of the telescope will stand at 0.095 of a meter. Now, prolonging the lines of vision to the rod R S we have formed a triangle g m a which subtends the angle a b c, and thus we form the following proportion, as $$a\ c : b\ c :: a\ m : m\ g$$

or $$a\ c \div b\ c = a\ m \div m\ g$$

Substituting values $\frac{10^m}{0.1} = \frac{a\ m}{m\ g}$

But m g is already known by the reading upon the rod, and as 0.1 of a meter is only one one-hundredth of ten meters we multiply the reading m g on the rod by one hundred which gives the distance a m in a horizontal line from the point where the two lines of vision cut each other to the rod. If the ground is ascending, we turn the telescope and reverse the angle so that the two vertical lines of the opposite ends of the telescope read ninety-five one-thousandths of a meter and one meter as before, but upon the opposite scales.

The horizontal reading, for convenience, is taken upon both of the rods R—S and T—U at the same time, and as the horizontal line cuts the rod T U in g', and the inclined line cuts it in p we then form the triangle a p g' which is similar to the triangle a b c. We have then the formula $$a\ c : b\ c :: a\ g' : p\ g'.$$

Substituting then $$10^m : 0^m.1 :: a\ g' : p\ g'.$$

Or $$10\ p\ g' = \frac{a\ g'}{10} \text{ and } a\ g' = 100\ p\ g',$$

which is the horizontal distance to a.

In the previous case, we have ten meters is to one-tenth of a meter as a m is to m g, or reduced a m equals one hundred m g. But m g and p g' are the result of the readings of the two rods, and to obtain the horizontal distance m g', we must add the two readings and multiply the same by one hundred. It is manifest that any other point of intersection of the two lines might be taken, as, 5, 4, 3, &c., but by using ten meters as the point of intersection the work is in decimals, and is easily figured out.

In the second instance, the instrument is higher than the foot of either of the rods. Fig. 5 illustrates this position. In this case I have illustrated the position of the instrument as d p c b. The horizontal distance is a g. The triangles formed by the inclination of the telescope so that the inclined line of vision cuts the horizontal at a are a b c and a g z, but we have seen in the first instance that the distance a g is equal to one hundred times the reading g z upon the rod, which is based upon the supposition of ten meters between a and c. In the same manner we calculate f s, and the whole distance $$g\ s = a\ g + a\ f + f\ s.$$

Substituting we obtain $$g\ s = 100\ g\ z + a\ f + 100\ s\ x.$$

Taking the common factor putting twice the base less $0^m.50$ in a f we have $$g\ s = 100\ (g\ z + s\ x) + 20^m - 0^m.50.$$

From this we conclude that when the feet of the rods are considerably below the foot of the instrument the horizontal distance is equal to the sum of the readings on the rods multiplied by $100 + 19^m.50$ of a meter. The number $0^m.50$ is equal to c p, the distance between the graduated arms M M'.

The last case is where the feet of the rods are above the foot of the instrument, as shown in diagram Fig. 6. In this case, consider the distance a c as before equal to ten meters, and the angle being once taken, it is only necessary to rotate the telescope about its vertical axis on the tripod to reverse the line of vision without changing the angle. The base of the telescope in this case is equal to m c and is in the line of the horizontal readings. We then have this proportion $$a\,c : b\,c :: a\,f : n\,f.$$

Substituting figures we have $$10^m : 0^m.1 :: a\,f : n\,f,$$

reduced $$10\,n\,f = \frac{a\,f}{10},\ \text{and}\ a\,f = 100\,n\,f.$$

$$m\,d : m\,h :: d\,p : p\,s.$$

Substituting and reducing we have $$10^m : 0^m.1 :: d\,p : p\,s.$$

$$10\,p\,s = \frac{d\,p}{10},\ d\,p = 100\,p\,s.$$

$$d\,p + a\,f = 100\,n\,f + 100\,p\,s.$$

Subtracting from this the distance a d which has been added twice, we have the distance from p to f, that is $$p\,a + a\,f = 100\,(n\,f + p\,s) - a\,d.$$

It will be readily seen that any measurements within the vision of the telescope, and in which the elevations are not greater than the length of the rods can be readily calculated, and the level and direction taken at the same time with this single instrument.

Having thus described my invention, what I claim as new, and desire to secure by Letters Patent, is—

1. An instrument consisting of the tripod, the disk supported thereon with universal joints, levels and leveling screws and compass, in combination with the horizontal arm projecting therefrom, a vertically slotted arm, a telescope mounted upon a supporting shaft, and movable vertically in the line of said slot, a second bar fixed upon the horizontal arm extending parallel with the axis of the telescope, and having at its opposite ends the vertical arms M M' with sub-divisions, indicators projecting from the opposite ends of the telescope to a horizontal line with the plane of its axis whereby the position of the line of vision with relation to the scales is accurately shown, substantially as herein described.

2. An instrument consisting of a horizontal disk with a supporting tripod and devices for leveling the disk, a second disk or compass case rotatable about a vertical axis upon the first disk, and having a horizontal arm projecting therefrom with a vertically slotted arm at its outer end, a telescope with a central arm adjustable in the vertical slot, and about which the telescope is turned to any desired vertical angle, vertical arms supported from the horizontal arm and having divisional links marked upon them opposite the ends of the telescope, and proportional to the horizontal distance between them, and indicators fixed to the ends of the telescope and movable therewith over the vertical scales, whereby readings are made from the scales proportional to readings from distant leveling rods, and said distances computed therefrom, substantially as herein described.

In witness whereof I have hereunto set my hand.

JUAN F. SANTILLANA.

Witnesses:
GEO. H. STRONG,
S. H. NOURSE.